United States Patent
Hirahara et al.

(10) Patent No.: US 7,625,839 B2
(45) Date of Patent: Dec. 1, 2009

(54) ACTIVATED CARBON FOR USE IN ELECTRIC DOUBLE LAYER CAPACITORS

(75) Inventors: Satoshi Hirahara, Yokohama (JP); Yositaka Takeda, Yokohama (JP); Kazuyuki Toki, Tajimi (JP)

(73) Assignees: Mitsubishi Chemical Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 334 days.

(21) Appl. No.: 11/471,701

(22) Filed: Jun. 21, 2006

(65) Prior Publication Data

US 2006/0240979 A1    Oct. 26, 2006

Related U.S. Application Data

(60) Division of application No. 10/040,419, filed on Jan. 9, 2002, now Pat. No. 7,091,156, which is a continuation of application No. PCT/JP01/03820, filed on May 7, 2001.

(30) Foreign Application Priority Data

May 9, 2000    (JP)    .............. 2000-136253

(51) Int. Cl.
*C01B 31/10*    (2006.01)
(52) U.S. Cl. ................... 502/432; 502/437
(58) Field of Classification Search .......... 502/432, 502/437
See application file for complete search history.

(56) References Cited

U.S. PATENT DOCUMENTS

| | | | |
|---|---|---|---|
| 3,624,004 A | 11/1971 | Wennerberg | |
| 5,064,805 A | 11/1991 | Otowa | |
| 5,254,597 A | 10/1993 | Horn et al. | |
| 5,416,056 A | 5/1995 | Baker | |
| 5,430,606 A | 7/1995 | Adachi et al. | |
| 5,626,637 A | 5/1997 | Baker | |
| 5,926,361 A | 7/1999 | Alford | |
| 5,956,225 A | 9/1999 | Okuyama et al. | |
| 5,965,479 A | 10/1999 | Suzuki et al. | |
| 6,064,560 A | 5/2000 | Hirahara et al. | |
| 6,599,856 B1 | 7/2003 | Uchino et al. | |
| 6,865,068 B1 * | 3/2005 | Murakami et al. | .......... 361/502 |

FOREIGN PATENT DOCUMENTS

| | | |
|---|---|---|
| EP | 0 514 545 A1 | 11/1992 |
| EP | 0 680 061 A1 | 11/1995 |
| EP | 0 938 109 | 8/1999 |
| EP | 0 973 180 A2 | 1/2000 |
| EP | 1 049 116 A1 | 11/2000 |
| EP | 1 115 130 A1 | 7/2001 |
| JP | 60-15138 | 4/1985 |
| JP | 63-187614 | 8/1988 |
| JP | 3038676 | 9/1989 |
| JP | 1-321620 | 12/1989 |
| JP | 3-18013 | 8/1991 |
| JP | 4-44407 | 7/1992 |
| JP | 4-70770 | 11/1992 |
| JP | 6-56827 | 7/1994 |
| JP | 9-320906 | 12/1997 |
| WO | WO 00/11688 | 3/2000 |
| WO | WO 01/86674 | 11/2001 |

* cited by examiner

*Primary Examiner*—Stuart Hendrickson
(74) *Attorney, Agent, or Firm*—Oblon, Spivak, McClelland, Maier & Neustadt, L.L.P.

(57) ABSTRACT

Activated carbon adapted for electric double layer capacitors is provided, which capacitors can give a large power density per unit volume and which capacitors, even when charge-and-discharge cycle is repeated under a large current or a constant voltage is continuously applied for a long time, undergo less decrease in output density. In particular, the present invention relates to the activated carbon manufactured by carbonization of coconut shell, which has a BET specific surface area of 2000 $m^2/g$ to 2500 $m^2/g$, an average pore diameter of 1.95 nm (19.5 Å) to 2.20 nm (22 Å) and a pore volume of pores having a pore diameter calculated according to a Cranston-Inkley method of 5.0 nm (50 Å) to 30.0 nm (300 Å), of 0.05 $cm^3/g$ to 0.15 $cm^3/g$.

9 Claims, No Drawings

ACTIVATED CARBON FOR USE IN ELECTRIC DOUBLE LAYER CAPACITORS

This application is a divisional of U.S. application Ser. No. 10/040,419 (now U.S. Pat. No. 7,091,156), filed on Jan. 9, 2002, which is a continuation of PCT/JP01/03820, filed on May 7, 2001, which claims priority to JP 2000-136253, filed on May 9, 2000.

TECHNICAL FIELD

This invention relates to activated carbon for used in electric double layer capacitors and, more particularly, to activated carbon for use in electric double layer capacitors manufactured from coconut shell and having excellent performance of a high output density and an excellent durability.

BACKGROUND ART

In recent years, in view of global environment protection, it has been conducted in the field of automobiles to develop technology for more improving specific fuel consumption and more purifying exhaust gas. As a part of such development, technology development on hybrid vehicles and electric vehicles have been promoted. With respect to the development of these technologies, practicable electric double layer capacitors have attracted attention for the use of driving system power assist or energy regeneration. Principle of the electric double layer capacitors is based on accumulation of charge between electric double layers formed at the interface region between a polarizable electrode and an electrolytic solution, advantage of which is that, in comparison with secondary batteries such as lead storage battery and nickel hydrogen secondary battery, they permit rapid charge and discharge at a large current. As a material for the polarizable electrode, activated carbon is commonly used due to its large interface and excellent conductivity. Electric double layer capacitors demanded for the use of hybrid vehicles and electric vehicles are required to have not only an electrostatic capacity (F) but a high power (W) density permitting repeated charge-and-discharge at a large current of 100 A order as well, and many technical problems still remain unsolved. Thus, in order to increase the power density, there have been proposed such electrode-manufacturing techniques as that thickness of porous electrodes mainly comprising activated carbon, thickness of current collectors and thickness of separators are made adequate (Japanese Patent Laid-Open No. 317332/1999) and that a composite electrode of activated carbon impregnated with aluminum is made as a polarizable electrode (International Patent Laid-Open No. 509560/1998).

On the other hand, it has been disclosed to use a carbonaceous material represented by activated carbon as an electrode material for electric double layer capacitors in Japanese Patent Publication No. 15138/1985, Japanese Patent Laid-Open Nos. 187614/88, 321620/1989 and 180013/1991, Japanese Patent Publication Nos. 56827/1994, 44407/1992 and 70770/1992.

Japanese Patent Laid-Open No. 321620/1989 discloses to use powdery activated carbon having been heat-treated at 1000° C. as an electrode material for capacitors, and Japanese Patent Laid-Open No. 180013/1991 discloses that electrostatic capacity of an electric double layer capacitor can be improved by adjusting amount of oxygen contained in activated carbon to from 25 to 35% by weight. In both publications, however, kinds and physical properties of the activated carbon are not disclosed at all.

In Japanese Patent Publication No. 70770/1992, it is disclosed that capacitors using activated carbon having an average pore diameter of 1.5 nm (15 Å) or more as an electrode material for the capacitor show excellent temperature properties and, in Japanese Patent Laid-Open No. 187614/1988, it is disclosed that powdery activated carbon showing a high electrostatic capacity has a specific surface area of 1800 to 3500 $m^2/g$ and an average pore diameter of 0.5 to 1.5 nm (5 to 15 Å), with the ratio of pore volume of pores having a diameter of 2.0 nm (20 Å) or more to the total pore volume being 20 to 40%. In these publications, however, it is not disclosed to select a specific range of 1.95 nm (19.5 Å) to 2.20 nm (22 Å) as to average pore diameter and select a range of 0.05 $cm^3/g$ to 0.15 $cm^3/g$ as to pore volume of pores having a pore diameter of 5.0 nm (50 Å) to 30.0 nm (300 Å), as are specified in the invention.

With respect to fibrous carbons, Japanese Patent Publication No. 15138/1985 discloses that fibrous carbon obtained by carbonizing phenolic fibers and conducting activation treatment is suited as an electrode material for capacitors and, in Japanese Patent Publication No. 56827/1994, it is disclosed that carbon fibers or carbon powder having a surface acidic functional group at a concentration of 1.0 meq./g or less is used as an electrode material for capacitors, that those with a specific surface area of 500 $m^2/g$ or more are preferred, and that phenol resin-based activated carbon fibers are specifically used. In addition, Japanese Patent Publication No. 44407/1992 discloses to use a product obtained by carbonizing and activating a specific phenol resin foam as an electrode material for capacitors.

However, although activated carbons obtained by carbonizing and activation-treating phenol resin-based materials as disclosed in Japanese Patent Publication Nos. 15138/1985, 56827/1994 and 44407/1992 have about the same specific area as that in the invention but, since the phenol resin-based carbonization products to be activated are of generally amorphous carbon, most of pores formed in the activated carbon obtained by activating the carbonization products have a pore diameter of 15 Å or less. Hence, as will be shown in Comparative Example 4 to be given hereinafter, the activated carbon usually has an average pore diameter of 18 Å or less which is smaller than the average pore diameter in the invention, and have substantially no pore distribution in a comparatively large pore region of 5.0 to 30.0 nm.

Besides, since electrode materials for electric double layer capacitors disclosed in these publications are intended to increase electrostatic capacity per unit weight or per unit volume (F/g or $F/cm^3$), discharge current density per unit area of the electrode shown in the charging and discharging test conducted in the specific examples is at a considerably low level of about 0.1 to about 2 $mA/cm^2$, and effects as electrode material at a high current density of, for example, 10 $mA/cm^2$ or more are not confirmed at all, thus these publications not disclosing activated carbons suited for the high power density uses at all. Activated carbon-fiber woven cloth prepared from phenol resins, disclosed in Japanese Patent Publication No. 15138/1985, has an advantage that it has a smaller electric resistance than electrodes obtained by molding or coating powdery activated carbon and, in this sense, it is preferred because a high power density is expected. However, it has the defect that capacity per volume is small though output per weight is large due to the small bulk density of the electrode made of it.

Accordingly, the electric double layer capacitors using as electrode material the activated carbons disclosed in these publications are not necessarily said to give a large output density per unit volume, though they show an increased energy density due to a comparatively large electrostatic capacity thereof.

Further, advantages required for the electric double layer capacitors are that number of usable charge-and-discharge cycles be large and that they have a high durability such as that they undergo a smaller decrease in capacity in a continuously voltage-applying test, as compared with those of the conventional secondary batteries. The electric double layer capacitor using, as an electrode material, activated carbon containing a large amount of oxygen as disclosed in the foregoing Japanese Patent Laid-Open No. 180013/1991 suffers a serious decrease in capacity due to an increase in resistance or the like upon charging and discharging, thus involving a serious problem as to durability.

With electrode materials using the known activated carbons described hereinbefore, it is possible to decrease inner electrical resistance of the electrode and increase the power density to some extent by improving the method for manufacturing the electrodes, but an activated carbon which gives electric double layer capacitors showing a high power density and an excellent durability still remains unfound.

An object of the present invention is to provide an activated carbon suited for producing an electric double layer capacitor which shows a large output density per unit volume and which, even when subjected to repeated charge-and-discharge cycles at a large electric current or even when a constant voltage is continuously applied thereto for a long period of time, undergoes only a slight decrease in power density.

DISCLOSURE OF THE INVENTION

As a result of intensive investigations to solve the above problems, the inventors have found that activated carbon obtained by subjecting a specific raw material to an activation treatment under appropriate conditions has an adequate pore distribution, an adequate specific surface area, an adequate surface state and adequate electrochemical properties, and shows a large output density per unit volume and an excellent durability due to the adequate properties, thus having achieved the invention based on the finding.

That is, the gist of the invention lies an activated carbon for use in electric double layer capacitors produced by carbonization of coconut shell, which is characterized in that a BET specific surface area is 2000 $m^2/g$ to 2500 $m^2/g$, an average pore diameter is 1.95 nm (19.5 Å) to 2.20 nm (22 Å) and a pore volume of pores having a pore diameter calculated according to a Cranston-Inkley method of 5.0 nm (50 Å) to 30.0 nm (300 Å) is 0.05 $cm^3/g$ to 0.15 $cm^3/g$.

As a preferred embodiment of the invention, in the activated carbon for use in electric double layer capacitors, an oxygen content per g of the active carbon is 1 mg to 20 mg, a rest potential vs a lithium electrode is 2.85 V to 3.03 V in a nonaqueous electrolytic solution, and the activated carbon obtained by subjecting a coconut shell carbonization product to steam activation.

BEST MODE FOR PRACTICING THE INVENTION

The present invention will now be described in more detail below.

The activated carbon of the invention for use in electric double layer capacitors is an activated carbon produced by carbonization of coconut shell, which must satisfy the conditions on the physical properties of a BET specific surface area of 2000 $m^2/g$ to 2500 $m^2/g$, an average pore diameter of 1.95 nm (19.5 Å) to 2.20 nm (22 Å) and a pore volume of pores having a pore diameter calculated according to a Cranston-Inkley method of 5.0 nm (50 Å) to 30.0 nm (300 Å), of 0.05 $cm^3/g$ to 0.15 $cm^3/g$ and, preferably, satisfies the conditions on the physical properties on the physical properties of an oxygen content of 1 mg to 20 mg per g of the active carbon, and a rest potential vs a lithium electrode of 2.85 V to 3.03 V in a nonaqueous electrolytic solution.

In an electric double layer capacitor using the activated carbon of the invention satisfying the conditions on the physical properties as a material for polarizable electrodes, bulk density of the activated carbon is enough high, and ion conductivity of electrolyte ion and solvent molecule of an electrolytic solution existing in the pores of the activated carbon is enough large to give a sufficiently high power even upon charging and discharging under a large electric current. In addition, durability of the electric double layer capacitor can be more improved by adjusting the amount of oxygen contained in the activated carbon to an adequate amount and adjusting a rest potential of the activated carbon electrode in a nonaqueous electrolytic solution to an adequate range.

Furthermore, the invention can realize such excellent properties of the activated carbon obtained from coconut shell, and hence the activated carbon of the invention has advantages over those obtained from expensive synthetic resins such as a phenol resin in productivity and cost.

It is necessary for the activated carbon of the invention for use in electric double layer capacitors to have a BET specific surface area, determined by the BET method according to a nitrogen adsorption method, of 2000 $m^2/g$ to 2500 $m^2/g$, preferably 2000 $m^2/g$ to 2400 $m^2/g$, more preferably 2050 $m^2/g$ to 2250 $m^2/g$, because, in case where specific surface area of the activated carbon is too large, there results a decrease in bulk density, leading to a decrease in power per unit volume. In case where the specific surface area is smaller than the range, there results a decrease in output per unit weight, thus such specific surface area not being preferred.

In addition, it is necessary for the activated carbon of the invention for use in electric double layer capacitors to have an average pore diameter of 1.95 nm (19.5 Å) to 2.20 nm (22 Å). In case where the average pore diameter is too small, electric resistance increases so much apparently due to diffusion resistance of electrolyte ion within the pores upon charging and discharging under a large electric current that the resulting capacitors are not suited for uses requiring a high output. On the other hand, in case where the average pore diameter is too large, there results a decrease in bulk density of the activated carbon and a decrease in output per unit volume, thus such pore diameter not being preferred. The pore diameter is preferably 2.00 nm (20.0 Å) to 2.15 nm (21.5 Å), more preferably 2.02 nm (20.2 Å) to 2.15 nm (21.5 Å).

Further, it is necessary for the activated carbon of the invention for use in electric double layer capacitors to have a pore volume of pores having a pore diameter calculated according to the Cranston-Inkley method of 5.0 nm (50 Å) to 30.0 nm (300 Å), of 0.05 $cm^3/g$ to 0.15 $cm^3/g$. In case where the pore volume is too large, there results a decrease in bulk density of electrode and a decrease in power per volume, thus such pore volume not being preferred. And, in case where the pore volume is too small, there results an increase in inner electrical resistance and, as a result, output density becomes smaller. Thus, the pore volume is preferably 0.07 to 0.13 $cm^3/g$, more preferably 0.08 to 0.12 $cm^3/g$.

It is necessary for the activated carbon of the invention for use in electric double layer capacitors to be produced from coconut shell. As common raw materials for activated carbon other than coconut shell, there are illustrated various ones such as petroleum-based pitch, petroleum coke, fibers obtained by spinning tar pitch, synthetic polymers, phenol resin, furan resin, polyvinyl chloride resin, polyvinylidene chloride resin, polyimide resin, polyamide resin, liquid crystal polymers, plastic wastes and wasted tires. However, in the case of using the phenol resin as a raw material for activated carbon, it is difficult to adjust the average pore diameter and the pore volume of pores having a pore diameter of 5.0 nm (50 Å) to 30.0 nm (300 Å) respectively to the ranges specified in the invention, though it is possible to obtain activated carbon having a specific surface area of 2000 m$^2$/g or more.

The activated carbon of the invention is obtained by carbonizing coconut shell, then activating the carbonization product. Activating methods are roughly classified into a gas activation method and a chemical agent activation method. The gas activation method, which is also called physical activation in contrast to that the chemical agent activation is chemical activation, is an activation to produce activated carbon by bringing the carbonized raw material into contact with steam, carbonic acid gas, oxygen or other oxidizing gas at a high temperature to conduct reaction. The chemical agent activation method is a method of uniformly impregnating the raw material with an activating chemical agent, heating it in an inert gas atmosphere to cause dehydration and oxidation reaction of the chemical agent to thereby obtain activated carbon. As the chemical agents to be used, there are illustrated zinc chloride, phosphoric acid, sodium phosphate, calcium chloride, potassium sulfide, potassium hydroxide, sodium hydroxide, potassium carbonate, sodium carbonate, sodium sulfate, potassium sulfate and calcium carbonate.

Methods for producing activated carbon are not particularly limited and, so long as the resultant activated carbon satisfies the requirements on the above-described properties, the methods are not limited to the above-mentioned methods. Of these activation methods, however, steam activation method is advantageous since activated carbon obtained by steam activation method shows an excellent durability when used in electric double layer capacitors and can be produced at a low production cost.

As to shape of activated carbon, there are various shapes such as pulverized shape, particulate shape, granular shape, fiber shape, felt shape, woven fabric and sheet, and activated carbon of any of them may be used in the invention.

The activated carbon in the invention obtained by steam activation method is obtained by pulverizing coconut shell, adjusting particle size of the pulverized product, then carbonizing (dry distillation) it in an inert atmosphere, and heat-treating the resulting coconut shell char at a temperature of 800° C. to 1300° C., preferably 850 to 1200° C., more preferably 900 to 1100° C., in an inert gas of nitrogen, argon or a combustion exhaust gas containing a steam gas atmosphere in a content of 30% by volume to 100% by volume.

Activated carbons from which metal impurities, ashes, etc. are removed by washing coconut shell before activation treatment, coconut shell char or activated carbon obtained by activation treatment, in an aqueous solution of hydrochloric acid, nitric acid, sulfuric acid or the like, are also included in the invention.

It is also possible to heat-treat the activated carbon having been subjected to activation treatment at 500 to 2500° C., preferably 700 to 1500° C., in an inert atmosphere of nitrogen, argon, helium or xenon to remove unnecessary functional groups at the surface thereof or enhancing crystallinity of carbon for increasing electron conductivity.

With particulate activated carbon, the average particle diameter is preferably 30 μm or less, more preferably 7 to 20 μm, in the point of improving bulk density of electrode and reducing its inner electrical resistance.

The activated carbon of the invention for use in electric double layer capacitors shows a rest potential vs Li/Li$^+$ as a counter electrode of preferably 2.85 V to 3.03 V, more preferably 2.90 to 3.00 V, in a nonaqueous electrolytic solution, in the electric double layer capacitor using the nonaqueous electrolytic solution. In case where the spontaneous potential is too large, there results reduction in durability of an electric double layer capacitor assembled using such activated carbon as, for example, a positive electrode, in which capacitor electric potential of the positive electrode after charging by applying a voltage of 2.5 V or more becomes about 4.3 V (vs Li/Li$^+$) to reach the oxidation decomposition potential of the electrolytic solution (4.3 V or more), thus decomposition reaction of the electrolytic solution occurring. Additionally, activated carbons having a spontaneous potential less than 2.85 V usually cannot be obtained by the aforesaid methods.

The rest potential of the carbonaceous electrode functioning as positive electrode in the invention is measured in a common electrochemical manner. Measurement of the potential in a nonaqueous electrolytic solution is not so strictly defined as with the standard hydrogen electrode in an aqueous solution. Actually, however, it has widely been conducted using such electrode as a silver-silver chloride electrode, a platinum electrode or a lithium electrode. In the invention, too, the potential can be measured according to the same methods.

Amount of oxygen contained in the activated carbon is a factor exerting some influence on durability of the electric double layer capacitor and, therefore, it is preferred to control the oxygen amount to an adequate amount. In the invention, the oxygen amount per g of the activated carbon is preferably 1 mg to 20 mg, more preferably 2 mg to 10 mg. In the invention, the amount of oxygen contained in the activated carbon is a value which is obtained by heat-treating the activated carbon at around 1000° C. in vacuo or in an inert gas atmosphere of an argon gas or a nitrogen gas, determining carbon monoxide (CO) and carbon dioxide ($CO_2$) contained in the decomposition gas generated upon the heat treatment, and calculating the total amount of oxygen contained in these molecules. Taking into consideration that the thermal decomposition temperature is around 1000° C., this oxygen amount corresponds to that of oxygen-containing functional groups in the activated carbon, i.e., carboxyl group, phenol group, ketone group, and the like and, in other words, the oxygen content in the invention can be said to be an indication of the total amount of oxygen-containing functional groups contained in the activated carbon.

In case where the oxygen amount per g of the activated carbon exceeds the above-described range, there results an increase in electrical resistance due to generation of gases inside the cell assumed to be caused by decomposition, or reaction with the electrolytic solution, of the oxygen-containing functional groups upon charging and discharging of the electric double layer capacitor and, as a result, durability of the capacitor will be decreased, thus such oxygen amount not being preferred. On the other hand, in case where the oxygen amount is less than the above-described range, there results a decrease in affinity of the activated carbon with a binder for electrode upon preparing electrodes and, as a result, bulk density of the electrode decreases, leading to a decrease in output per unit volume, thus such oxygen amount not being preferred.

Descriptions are given below with respect to the case of constituting an electric double layer capacitor using the activated carbon of the invention.

Polarizable electrodes composed mainly of the activated carbon can be formed in a conventional manner and are mainly constituted by the activated carbon and a binder and, further, a conductive material may be added thereto for imparting conductivity to the electrodes. The activated carbon can be molded in a conventionally known manner. For example, an electrode can be obtained as a molding by adding polytetrafluoroethylene to a mixture of the activated carbon and acetylene black, mixing them, then press-molding the mixture. Alternatively, an electrode can be obtained as a molding by adding coal pitch having a comparatively high softening point as a binder to the activated carbon, mixing them, molding the mixture, then calcining the molding to a temperature of the thermal decomposition temperature of the binder or higher in an inert atmosphere. Further, it is also possible to prepare a polarizable electrode by calcining only the activated carbon without using the conductive material and the binder. The electrode may be formed as a thin coat film, a sheet-like molding or a plate-like molding, or a plate-like molding composed of a composite material.

Additionally, the activated carbon may be pulverized to a desired granular shape before mixing with a binder, or may be mixed as particles having a comparatively large particle diameter with a binder, followed by pulverizing together with the binder to obtain a product as a mixture slurry or a dry pulverization product.

As the conductive material to be used for the activated carbon electrode, at least one conductive material selected from the group consisting of carbon black such as acetylene black and KETJEN BLACK, natural graphite, thermal expansion graphite, carbon fibers, ruthenium oxide, titanium oxide, and metal fibers such as aluminum and nickel. Of these, acetylene black and KETJEN BLACK are particularly preferred in the point that a small amount thereof is enough to effectively improve conductivity. Amount of the conductive material based on the activated carbon is preferably 5 to 50% by weight, particularly preferably 10 to 30% by weight, though depending upon bulk density of the activated carbon, because, in case where the amount of conductive material is too large, proportion of the activated carbon is decreased, leading to a decreased volume of the electrode.

As a binder, there is preferably used at least one of polytetrafluoroethylene, polyvinylidene fluoride, carboxy cellulose, methyl cellulose, crosslinked fluoro-olefin copolymer, polyvinyl alcohol, polyacrylic acid, polyimide, petroleum pitch, coal pitch and phenol resin.

A current collector is not particularly limited, and any one that has enough corrosion resistance both electrochemically and chemically may be used. For example, as a current collector for a positive electrode, that made of stainless steel, aluminum, titanium or tantalum is illustrated and, as a current collector for a negative electrode, that made of stainless steel, nickel, aluminum or copper is preferably used.

The electrolytic solution is preferably a nonaqueous electrolytic solution. As solutes of the nonaqueous electrolytic solution, a salt of a combination of a quaternary onium cation exemplified by $R_4N^+$, $R_4P^+$ (wherein R represents an alkyl group shown by $C_nH_{2n+1}$; n=1 to 4) or triethylmethyl ammonium ion and an anion of $BF_4^-$, $PF_6^-$, $ClO_4^-$, $SbF_6^-$ or $CF_3SO_3^-$; or a lithium salt wherein cation is lithium ion is used. As the lithium salt, one or more substances selected from among $LiBF_4$, $LiClO_4$, $LiPF_6$, $LiSbF_6$, $LiAsF_6$, $LiCF_3SO_3$, $LiC(CF_3SO_2)_3$, $LiB(C_6H_5)_4$, $LiC_4F_9SO_3$, $LiC_8F_{17}SO_3$ and $LiN(CF_3SO_2)_2$ are preferred. In particular, in view of conductivity, stability and low cost, salts of a combination of a cation of $R_4N^+$ (wherein R represents an alkyl group shown by $C_nH_{2n+1}$; n=1 to 4) or triethylmethyl ammonium ion and an anion of $BF_4^-$, $PF_6^-$, $ClO_4^-$ or $SbF_6^-$ are preferred.

Concentration of the solute in the nonaqueous electrolytic solution is preferably 0.3 to 2.0 mols/liter so as to sufficiently obtain characteristic properties of the electric double layer capacitor, with 0.7 mol/liter to 1.9 mols/liter being particularly preferred to obtain a higher conductivity. A concentration of not less than 2.0 mols/liter is not preferred because, upon charging and discharging at a low temperature of −20° C. or lower, conductivity of the electrolytic solution is decreased. A concentration of not more than 0.3 mol/liter is not preferred because conductivity becomes small at room temperature or at lower temperatures.

As the electrolytic solution, a solution of tetraethylammonium tetrafluoroborate ($Et_4NB_4$) in propylene carbonate is preferred, and concentration of $Et_4NB_4$ is preferably 0.5 to 1.0 mol/liter.

Solvents for the nonaqueous electrolytic solution are not particularly limited, but are preferably one or more organic solvents selected from among propylene carbonate, ethylene carbonate, butylene carbonate, dimethyl carbonate, methyl ethyl carbonate, diethyl carbonate, sulfolane, methylsulfolane, γ-butyrolactone, γ-valorolactone, N-methyloxazolidinone, dimethylsulfoxide and trimethylsulfoxide. In view of excellent electrochemical and chemical stability and conductivity, one or more organic solvents selected from among propylene carbonate, ethylene carbonate, butylene carbonate, dimethyl carbonate, methyl ethyl carbonate, diethyl carbonate, sulfolane, methylsulfolane and γ-butyrolactone are particularly preferred. However, high-melting point solvents such as ethylene carbonate cannot be used independently because they become solid at lower temperatures, and must be used as a mixed solvent with low-melting point solvents such as propylene carbonate or the like.

Water content in the nonaqueous electrolytic solution is preferably 200 ppm or lower, more preferably 50 ppm or lower, so as to obtain a high withstand voltage.

EXAMPLES

The invention is now described in more detail by reference to specific examples, but is not limited thereto unless exceeding the gist of the invention.

Examples 1 to 6, Comparative Examples 1 to 5

Example of Producing Activated Carbon

Coconut shell char (50 g) was placed in a rotary kiln into which a steam-containing nitrogen gas was allowed to pass, to thereby conduct steam activation. Activation temperature, activation time and concentration of steam in the nitrogen gas were as shown in the following Table-1. The thus obtained activated product was washed with hydrochloric acid, and repeatedly washed with demineralized water. After washing, the activated product was dried, and the dried activated product was pulverized to obtain active carbon powder having an average particle diameter of 10 to 20 μm (Examples 1 to 6, Comparative Examples 1, 3) In Comparative Example 2, the same procedure as in Example 1 was conducted except for using a pulverized product of bituminous coal in place of the coconut shell char to obtain activated carbon powders and, in Comparative Examples 4, 5, the same procedure as in Example 1 was conducted except for respectively using carbonized products obtained by carbonizing phenol resin (novolak) cured product at 700° C. in a nitrogen atmosphere in place of the coconut shell char to obtain activated carbon powders.

TABLE 1

|  |  | Steam Concentration (vol %) | Activation Temperature ° C. | Activation Time min. |
|---|---|---|---|---|
| Example | 1 | 80 | 930 | 135 |
|  | 2 | 80 | 930 | 125 |
|  | 3 | 60 | 900 | 150 |
|  | 4 | 60 | 900 | 135 |
|  | 5 | 60 | 900 | 130 |

TABLE 1-continued

|  |  | Steam Concentration (vol %) | Activation Temperature ° C. | Activation Time min. |
|---|---|---|---|---|
|  | 6 | 60 | 900 | 125 |
| Com. Ex. | 1 | 60 | 900 | 80 |
|  | 2 | 60 | 900 | 140 |
|  | 3 | 60 | 900 | 130 |
|  | 4 | 60 | 900 | 140 |
|  | 5 | 60 | 900 | 130 |

Measurement of Physical Properties of Activated Carbon

BET specific surface area, pore volume of pores having a pore diameter of 5.0 nm (50 Å) to 30.0 nm (300 Å), and total pore volume, of activated carbon powders thus obtained were calculated from adsorption isotherm of activated carbon obtained by measuring equilibrium adsorption amount of nitrogen gas of each activated carbon powder under each relative pressure at a liquid nitrogen temperature using a Sorptomatic Model 1800 (made by Faison).

Average pore diameter of the activated carbon powder was calculated from the total pore volume and the BET specific surface area determined from the above-described isotherm of nitrogen gas assuming that the pore of the active carbon is of a cylindrical shape.

Amount of oxygen contained in the activated carbon was determined as follows.

A quartz glass-made reaction tube containing therein about 1 g of activated carbon powder was heated to about 1000° C., and a gas generated during the heating was injected into a gas chromatograph analyzer to determine a CO component and a $CO_2$ component in the generated gas. Sum of the oxygen amounts of determined CO and $CO_2$ components was calculated to obtain the amount of oxygen contained per g of the activated carbon.

Physical properties of the activated carbons thus calculated are tabulated in Table-2.

TABLE 2

(Physical Properties of Active Carbon)

|  |  | Raw Material | Specific Surface Area $m^2/g$ | Total Pore Volume $cm^3/g$ | Average Pore Diameter nm | 5.0-30.0 nm volume $cm^3/g$ | Amount of Contained Oxygen mg/g | Spontaneous Potential V vs $Li/Li^+$ |
|---|---|---|---|---|---|---|---|---|
| Example | 1 | Coconut shell | 2351 | 1.20 | 2.03 | 0.106 | 8.1 | 3.02 |
|  | 2 | Coconut shell | 2294 | 1.14 | 2.00 | 0.090 | 6.1 | 3.02 |
|  | 3 | Coconut shell | 2250 | 1.14 | 2.03 | 0.075 | 8.5 | 3.01 |
|  | 4 | Coconut shell | 2154 | 1.08 | 2.01 | 0.126 | 9.1 | 3.02 |
|  | 5 | Coconut shell | 2147 | 1.07 | 2.00 | 0.121 | 1.8 | 2.99 |
|  | 6 | Coconut shell | 2024 | 1.00 | 2.00 | 0.130 | 2.5 | 2.99 |
| Com. Ex. | 1 | Coconut shell | 1589 | 0.74 | 1.87 | 0.035 | 1.9 | 2.98 |
|  | 2 | Coal | 1387 | 0.73 | 2.10 | 0.666 | 9.2 | 3.02 |
|  | 3 | Coconut shell | 1960 | 0.98 | 2.01 | 0.122 | 21 | 3.05 |
|  | 4 | Phenol resin | 2110 | 0.944 | 1.79 | 0.021 | 2.9 | 3.03 |
|  | 5 | Phenol resin | 1855 | 0.808 | 1.74 | 0.010 | 2.3 | 3.02 |

Test Example 1

Evaluation-1 of Capacitor Performance of Activated Carbon: Initial Performance

Each of the activated carbons obtained in the above-described examples of producing activated carbons was tested as follows. A mixture composed of 80% by weight of the activated carbon powder, 10% by weight of acetylene black and 10% by weight of polytetrafluoroethylene was kneaded, and press-molded into a disc-like molding of 10 mm in diameter and 0.5 mm in thickness under a pressure of 50 kgf/cm² through an oil hydraulic press using a tablet-molding apparatus (made by Nippon Bunko Co., Ltd.), thus a positive electrode molding being obtained. Similarly, another sheet of the molding was prepared to use as a negative electrode molding. The thus obtained two moldings were dried at 300° C. for 3 hours under a vacuum of 0.1 torr or lower. The thus dried two moldings were transferred into a dry box kept in a nitrogen gas atmosphere, then the positive and negative electrode moldings were impregnated with an electrolytic solution of a solution of $(C_2H_5)_4NBF_4$ in propylene carbonate in vacuo. Subsequently, the positive electrode molding and the negative electrode molding impregnated with the electrolytic solution were disposed in confronting relation to each other with a polyethylene-made separator interposed therebetween, followed by caulk-sealing the assembly inside a stainless steel-made coin cell to obtain a coin cell type electric double layer capacitor.

To the thus obtained coin cell type electric double layer capacitor was applied a voltage of 2.5 V in a 25° C. thermostatic chamber using a charge-and-discharge tester, model HJ-201 (made by Hokuto Denko Co., Ltd.), then the capacitor was allowed to discharge at a constant current of 20 mA/cm² in current density. Initial electrostatic capacity (F) was determined from the slope of the thus obtained discharge curve between 2.5 V and 1.0 V. In addition, voltage drop immediately after discharge (IR-drop) was read off from the discharge curve. A too large IR-drop is not preferred, since only a small energy density is eventually available. Results are shown in Table-3.

TABLE 3

(Initial performance 25° C./2.5 V coin cell)

|  |  | Electrostatic Capacity (F) | IR-drop (V) |
|---|---|---|---|
| Example | 1 | 0.96 | 0.05 |
|  | 2 | 0.98 | 0.10 |
|  | 3 | 1.02 | 0.12 |
|  | 4 | 0.97 | 0.13 |
|  | 5 | 1.03 | 0.10 |
|  | 6 | 1.00 | 0.13 |
| Comparative Example | 1 | 0.90 | 0.25 |
|  | 2 | 0.88 | 0.26 |
|  | 3 | 0.90 | 0.30 |
|  | 4 | 0.88 | 0.33 |
|  | 5 | 0.88 | 0.34 |

Test Example 2

Evaluation-2 of Capacitor Performance of Activated Carbon: Initial Performance

Distilled water was added to a mixture composed of 8 parts by weight of each of the activated carbons obtained in the examples of producing the activated carbon, 3 parts by weight of conductive carbon black and 3 parts by weight of cellulose series binder, then kneading the mixture to obtain a coating paste of an electrode. The thus obtained paste was coated on an etched aluminum foil, followed by drying to obtain an electrode body having coated thereon a 40-μm thick activated carbon paste. From this electrode body were obtained two electrode bodies having an effective electrode area of 7.07 cm×7.07 cm (50 cm²), one being used as a positive electrode and the other as a negative electrode. The positive and negative electrodes were disposed in confronting relation to each other with the activated carbon electrode coat inside, with a cellulose series separator being provided therebetween, to obtain an electrochemical element. This element was sandwiched between glass plates, and the glass plates were sandwiched between stainless steel-made plates, followed by fixing the element using bolts and nuts to obtain an electric double layer capacitor element. The thus obtained capacitor element was heat-dried in vacuo to remove impurities. Subsequently, the element was impregnated with an electrolytic solution of a solution of $(C_2H_5)_4NBF_4$ in propylene carbonate to obtain an electric double layer capacitor.

To the thus obtained electric double layer capacitor was applied a voltage of 2.5 V in a 25° C. thermostatic chamber using a commercially available charge-and-discharge tester, then the capacitor was allowed to discharge. Electrostatic capacity (F/cm³), inner electrical resistance (Ω) and power density (W/cm³) obtained by discharging from 2.5 V to 1.5 V for 2 seconds were calculated from the discharge curve. Capacitor performances per unit volume (F/cm³ and W/cm³) were calculated by converting the electrostatic capacity (F) and output (W) determined from the obtained discharge curve to values per volume of the activated carbon electrode coat. The thus calculated capacitor properties are shown in Table-4.

TABLE 4

(Initial properties of capacitors, 25° C./2.5 V)

|  | Electrostatic Capacity F/cm³ | Inner Electrical Resistance Ω | 2-Sec. Power Density W/cm³ |
|---|---|---|---|
| Example 3 | 13.0 | 0.15 | 7.8 |
| Example 4 | 12.2 | 0.14 | 7.4 |
| Example 5 | 1.00 | 0.14 | 7.7 |
| Comparative Example 1 | 12.1 | 0.19 | 6.8 |
| Comparative Example 2 | 9.7 | 0.15 | 6.6 |

Test Example 3

Evaluation-3 of Capacitor Performance of Activated Carbon: Durability

Durability test of the electric double layer capacitors was conducted in the following manner.

A mixture composed of 80% by weight of the activated carbon powder of each of the activated carbons obtained in the above-described examples of producing the activated carbon, 10% by weight of acetylene black and 10% by weight of polytetrafluoroethylene was kneaded, and press-molded into a disc-like molding of 10 mm in diameter and 0.5 mm in thickness under a pressure of 50 kgf/cm² through an oil hydraulic press using a tablet-molding apparatus (made by Nippon Bunko Co., Ltd.), thus a positive electrode molding being obtained. Similarly, another sheet of the molding was prepared to use as a negative electrode molding. The thus obtained two moldings were dried at 300° C. for 3 hours under a vacuum of 0.1 torr or lower. The thus dried two moldings were transferred into a dry box kept in a nitrogen gas atmosphere, then the positive and negative electrode moldings were impregnated with an electrolytic solution of a solution of $(C_2H_5)_4NBF_4$ in propylene carbonate in vacuo. Subsequently, the positive electrode molding and the negative electrode molding impregnated with the electrolytic solution were disposed in confronting relation to each other with a polyethylene-made separator interposed therebetween, followed by caulk-sealing the assembly in a stainless steel-made coin cell to obtain a coin cell type electric double layer capacitor.

To the thus obtained coin cell type electric double layer capacitor was applied a voltage of 2.8 V in a 70° C. thermostatic chamber using a charge-and-discharge tester, model HJ-201 (made by Hokuto Denko Co., Ltd.), then the capacitor was allowed to discharge at a constant current of 10 mA/cm² in current density. Initial electrostatic capacity (F) was determined from the slope of the thus obtained discharge curve. Then, after continuously applying a voltage of 2.8 V for 500 hours, the capacitor was allowed to discharge, and electrostatic capacity (F) after durability test was determined. Change of the capacity in terms of the ratio of electrostatic capacity after durability test to the initial capacity (%) are shown in Table-5.

TABLE 5

(durability, 70° C./2.8 V)

|  | Initial Capacity F | After 500 hrs F | Rate of Change % |
|---|---|---|---|
| Example 2 | 1.50 | 1.38 | 92 |
| Example 3 | 1.57 | 1.43 | 91 |
| Example 4 | 1.49 | 1.37 | 92 |
| Example 6 | 1.49 | 1.39 | 93 |
| Comparative Example 3 | 1.47 | 1.15 | 78 |

Test Example 4

Measurement of Spontaneous Potential of Activated Carbon

A mixture composed of 80% by weight of the activated carbon powder of each of the activated carbons obtained in the examples of producing the activated carbon, 10% by weight of acetylene black and 10% by weight of polytetrafluoroethylene was kneaded, and press-molded into a disc-like molding of 10 mm in diameter and 0.5 mm in thickness under a pressure of 50 kgf/cm² through an oil hydraulic press using a tablet-molding apparatus (made by Nihon Bunko Co., Ltd.). The thus obtained molding was dried at 300° C. for 3 hours under a vacuum of 0.1 torr or lower. The thus dried activated carbon electrode and a metallic lithium foil of 0.5 mm in thickness punched as a 10-mm diameter piece were disposed in confronting relation to each other with a polyethylene-made separator (made by Mitsubisi Chemical Corporation) interposed therebetween, followed by sandwiching the activated carbon electrode and the metallic lithium foil from outside by platinum plates functioning as a current collector. The resulting assembly was then held from the outermost sides by two sheets of 5-mm thick Teflon plate having four bolt holes to securely contact the current collectors, the activated carbon electrodes and the separator to each other. This was then dipped in a 1 mol/liter solution of LiBF$_4$ in propylene carbonate placed in a beaker. Subsequently, the current collector on the activated carbon electrode side and the current collector on the metallic lithium foil side were wired to each other via a potentiometer to measure a spontaneous potential of the activated carbon electrode. Spontaneous potentials of respective activated carbon electrodes in case of using, as a counter electrode thereof, lithium (V vs Li/Li$^+$) are shown in Table-2.

INDUSTRIAL UTILITY

An electric double layer capacitor which can give a large power density per unit volume and which, even when charge-and-discharge cycle is repeated under a large current or a constant voltage is continuously applied for a long time, undergoes less decrease in power density can be provided by using activated carbon of the invention manufactured from coconut shell and having an adequate pore distribution, an adequate specific surface area, an adequate surface state and adequate electrochemical properties.

While the invention has been described in detail and with reference to specific embodiments thereof, it will be apparent to one skilled in the art that various changes and modifications can be made therein without departing from the spirit and scope thereof.

This application is based on Japanese patent application No. 2000-136253 filed on May 9, 2000, the entire contents thereof being hereby incorporated by reference.

The invention claimed is:

1. A method of making an activated carbon, which comprises the steps of:
    a) pulverizing a coconut shell;
    b) carbonizing said coconut shell in an inert atmosphere to produce a coconut shell char; and
    c) heat-treating said coconut shell char at a temperature ranging from 900° C. to 1,100° C. in a steam gas atmosphere containing an inert gas selected from the group consisting of nitrogen, argon, and a combustion exhaust gas, wherein the content of steam in said steam gas atmosphere ranges from 30% by volume to 100% by volume,
    wherein said activated carbon has a BET specific surface area of 2000 m$^2$/g to 2500 m$^2$/g, and an average pore diameter of 1.95 nm (19.5 Å) to 2.20 nm (22 Å),
    wherein the pore volume of pores having a pore diameter, as calculated according to a Cranston-Inkley method, of 5.0 nm (50 Å) to 30.0 nm (300 Å) is 0.05 cm$^3$/g to 0.15 cm$^3$/g.

2. The method as claimed in claim 1, wherein the BET specific surface area is 2000 m$^2$/g to 2400 m$^2$/g.

3. The method as claimed in claim 1, wherein the BET specific surface area is 2050 m$^2$/g to 2250 m$^2$/g.

4. The method as claimed in claim 1, wherein the pore volume of pores having a pore diameter, calculated according to a Cranston-Inkley method, of 5.0 nm (50 Å) to 30.0 nm (300 Å) is 0.07 cm$^3$/g to 0.13 cm$^3$/g.

5. The method as claimed in claim 1, wherein the pore volume of pores having a pore diameter, calculated according to a Cranston-Inkley method, of 5.0 nm (50 Å) to 30.0 nm (300 Å) is 0.08 cm$^3$/g to 0.12 cm$^3$/g.

6. The method as claimed in claim 1, wherein the average pore diameter is 2.00 nm to 2.15 nm.

7. The method as claimed in claim 1, wherein the average pore diameter is 2.02 nm to 2.15 nm.

8. The method as claimed in claim 1, wherein the heat-treating temperature ranges from 900° C. to 930° C.

9. The method as claimed in claim 1, wherein the heat-treating is for 125 min. to 150 min.

* * * * *